US006220588B1

(12) United States Patent
Tünkers

(10) Patent No.: US 6,220,588 B1
(45) Date of Patent: Apr. 24, 2001

(54) TOGGLE CLAMPING DEVICE OR PISTON CYLINDER UNIT

(75) Inventor: Josef-Gerhard Tünkers, Ratingen (DE)

(73) Assignee: Tunkers Maschinenbau GmbH, Ratingen (DE)

( * ) Notice: Subject to any disclaimer, the term of this patent is extended or adjusted under 35 U.S.C. 154(b) by 0 days.

(21) Appl. No.: 09/324,573

(22) Filed: Jun. 2, 1999

(30) Foreign Application Priority Data

Jun. 2, 1998 (DE) .............................................. 198 24 579

(51) Int. Cl.[7] ....................................................... B23Q 3/08

(52) U.S. Cl. ................................................................ 269/32

(58) Field of Search ................................ 269/32, 24, 237, 269/20, 27, 30; 91/399, 400, 401

(56) References Cited

U.S. PATENT DOCUMENTS

| | | |
|---|---|---|
| 2,436,941 | 3/1948 | Sendoykas . |
| 2,980,387 | 4/1961 | Devlin . |
| 2,983,256 | 5/1961 | Seeloff . |
| 2,985,140 | 5/1961 | Fagge . |
| 3,180,236 | 4/1965 | Beckett . |
| 3,371,953 | 3/1968 | Blatt . |
| 3,480,271 | 11/1969 | Coutilish . |
| 3,482,831 | 12/1969 | Blatt . |
| 3,545,050 | 12/1970 | Blatt et al. . |
| 3,815,480 | 6/1974 | Spyra . |
| 3,961,559 | 6/1976 | Teramachi . |
| 3,994,539 | 11/1976 | Gottlieb . |
| 4,021,027 | 5/1977 | Blatt . |
| 4,240,620 * | 12/1980 | Tunkers ................................. 269/32 |
| 4,424,737 | 1/1984 | Endo . |
| 4,429,715 | 2/1984 | Goldsmith . |
| 4,700,611 | 10/1987 | Kaneko . |
| 4,905,973 | 3/1990 | Blatt . |
| 5,072,652 | 12/1991 | Blatt . |
| 5,171,001 | 12/1992 | Sawdon . |
| 5,201,838 | 4/1993 | Roudaut . |

FOREIGN PATENT DOCUMENTS

| | | |
|---|---|---|
| 3022376 C2 | 12/1981 | (DE) . |
| 90 16 781 U | 4/1992 | (DE) . |
| 92 15 151 U | 1/1993 | (DE) . |
| 1413751 | 11/1975 | (GB) . |

* cited by examiner

*Primary Examiner*—Robert C. Watson
(74) *Attorney, Agent, or Firm*—Brinks Hofer Gilson & Lione

(57) ABSTRACT

A toggle clamping device or piston-cylinder unit including mechanism for adjusting the opening angle of the clamping arm. Within the cylinder there are a number of interrogator devices that function to determine the position of pistons within the cylinder and transmit this information to a micro processor. The location of the interrogator devices can be adjusted. Also within the cylinder there are damping mechanism, the location of which can also be adjusted. When the toggle clamping device is in use, the opening angle of the clamping arm, the final-position of the interrogator devices and the final-position of the damping mechanism can be adjusted and locked simultaneously and jointly through a single adjusting element from the outside of the device without dismantling the toggle clamping device.

30 Claims, 4 Drawing Sheets

TOGGLE CLAMPING DEVICE OR PISTON CYLINDER UNIT

BACKGROUND OF THE INVENTION

The invention relates to a toggle clamping device for use in car bodywork construction in the motor vehicle industry.

The present invention relates to a toggle clamping device or piston-cylinder unit in which, when in the installed condition, the opening angle of a clamping arm, the final position of an interrogator device and the final position of a damping device can all be adjusted and locked simultaneously and jointly through a single adjusting element from outside of the toggle clamping device. The adjusting can be accomplished without dismantling the toggle clamping device.

There is shown in U.S. Pat. No. 5,845,897 a toggle clamping device for car bodywork construction having a rectangular grip holder having a cross-section guided orthogonally in relation to the longitudinal axis of the piston rod and being constructed from two housing sections, and with a cylinder attached in axial extension to the cylinder-side end of the grip holder. U.S. Pat. No. 5,845,897 is hereby, included by reference, as a part of this specification. In U.S. Pat. No. 5,845,897, the piston which is to be acted upon alternately on both sides by pressure-medium pressure, in particular air pressure, is guided in a longitudinally displaceable and sealing manner, and extends through the cylinder and a hollow space of the grip holder with its piston rod in the axial direction. A toggle joint arrangement with a clamping arm coupled thereto is fixedly connected at the free end of the piston rod. Limit switches, pneumatic switches and sensors are integrated within a space in the grip holder. The switches are adjustable relative to one another and are arranged and fixed to a mount forming a cover and serve as an interchangeable interrogator cassette in the form of a printed circuit in way of a slot that extends in the axial direction of the grip holder. The interrogator cassette, in top plan view, has a T-shaped configuration including an attachment rail and a flange that is linked to a section of the piston rod. The interrogator cassette is plugged in through a narrow slot extending in the direction of the piston rod from the back of the housing of the grip holder. This arrangement permits the toggle clamping device to be attached from all four sides from the back in such a manner that the section will seal the slot joint-tight towards the outside. The section can be designed in an L-shaped configuration in a cross-section guided orthogonally in relation to the longitudinal axis of the piston rod. The land of the "L" is parallel with the longitudinal axis of the piston rod and has switches as adjustable versions, while the crossbar closes the slot towards the outside. A further embodiment is provided with a grip holder consisting of two dish-shaped housing sections lying flush on top of each other and encasing the toggle joint arrangement. The piston rod and the limit switches are provided in a dirt and dust proof manner towards the outside. The dish-shaped housing sections feature the slot for arranging the interrogator cassette on the one, i.e., the narrower side, of the grip holder that has a rectangular cross-section. The section can plunge into the slot to such an extent that the one, i.e., the narrower side of the grip holder having a rectangular cross-section, surmounts the boundary of the L-shaped section which is pointing towards the outside. This toggle clamping device is equipped with a limit stop for the toggle joint arrangement, primarily in the above-dead-center position of the toggle joint, the limit stop being designed as a stop which is adjustable in the direction of its longitudinal axis to be actuated upon from the outside as a crew cap. For toggle clamping devices, operating with this so-called cassette technique, the interrogator cassette is plugged into the housing from the rear of the clamp housing through a narrow, slot-shaped openings. This construction results in very low service demands, since, for instance, by loosening just one screw it is possible to interchange the complete interrogator cassette that have a switch and plug which are completely cabled in themselves. Therefore, a completely interchangeable stock of interrogator cassettes can be available. This ensures minimum downtimes in the event that the case the interrogator cassette should have to be changed. It is also possible to quickly adjust interrogator cassettes for certain strokes and/or opening angles for replacement with build-in interrogator cassettes.

There is disclosed in EP 0 778 107 A1 a toggle clamping device for use in car bodywork construction in the motor vehicle industry, with a grip holder and a cylinder attached thereto in axial extension, in which a piston to be acted upon alternately on both sides by the pressure-medium, preferably air pressure, is guided in a longitudinally displaceable and sealing manner and extends through the cylinder and the grip holder with its piston rod. A toggle joint is arranged with an associated clamping arm within the housing of the grip holder at the free end of the piston rod. The piston subdivides the cylinder into a cylinder return stroke chamber and into a cylinder clamping stroke chamber. The cylinder clamping stroke chamber is closed in a sealing manner on the front end side by a cover to which a damping device for braking the opening movement of the piston is allocated. The cylinder return stroke chamber and the cylinder clamping stroke chamber are either alternately connected to the pressure-means source or vented through a one each connection duct. The connection duct functions to relieve the cylinder clamping chamber or to be connected with the pressure-medium source being shut off from the cylinder clamping chamber starting from a certain opening stroke of the piston, whereupon the cylinder clamping chamber is vented only via a throttle device. The damping device is controlled or adjustable. This reference suggest designing the damping device as a function of the opening angle of the clamping arm, preferably in an infinitely variable and, particularly in a longitudinally adjustable manner. This is accomplished by a machining operation. This makes it possible to adjust the throttle device depending on the operating conditions so that a particularly sensitive and accurate damping effect can be achieved. To enable final position damping over a larger range of an angle of swing from 0 to 125°, the damping device is designed to be longitudinally variable and lockable in its axial extension in relation to the piston. The throttle device can be varied depending on the desired angle of swing of the clamping arm either by continuous or other variation of the axial length of the throttle body. In one embodiment of this reference, this can be done by the supporting piston having a projection on the front side facing the piston which is longitudinally adjustable depending on the desired angle of swing. This longitudinally adjustability can be achieved in an infinitely variable manner, however, also by removal of material, for instance by covering the projection in order to achieve the desired damping effect depending on the angle of swing of the clamping arm. The damping body can consist of two or several parts which are telescopically adjustable within each other. These parts can be connected with each other, for example, by screw threads. Furthermore, it is also disclosed in this reference that the length can be adjusted hydraulically, for instance by corresponding stroke adjustment of a piston in a cylinder, thereby accommodating the respectively desired angle of swing of the arm and achieving the respectively desired damping effect.

A toggle clamping device is disclosed in DE 42 42 601 A1 that includes a piston-cylinder arrangement in which the piston and piston rod are guided in the cylinder and are displaceable between two final position limiting elements by being acted upon by the pressure medium. At least one of the two final position having limiting elements that are adjustable in the axial direction within the cylinder, and at least one final position limiting element being held in a torsion-proof manner within the cylinder and adjustable by a spindle supported at the cylinder. This spindle is configured as a threaded spindle in certain areas and extends through a threaded bore of the one final position limiting element into a corresponding opening of the piston rod. The spindle can be turned by means of a hand-wheel arranged on the front side of the cylinder. The respective final position limiting element is arranged in a corresponding counter-thread for longitudinal adjustment by means of a male or female thread. Switches for control of the piston-cylinder arrangement are adjusted simultaneous with the adjustment of the respective final position limiting element. As a result of the one final position limiting element being displaceable in axial direction within the cylinder, an infinitely variable adjustment of the length of stroke of the piston rod according to the respective requirements can be achieved. Adjustment of the final position limiting element is affected by means of a spindle supported at the outer housing cover of the cylinder and extending through a tapped hole of the final position limiting element into a corresponding opening of the piston rod.

Also, there is disclosed in DE 91 04 532.01 U1 a toggle clamping device for car bodywork construction that includes a grip holder and a cylinder attached thereto in axial extension, in which a piston to be acted upon alternately on both sides by pressure-medium pressure by air pressure. In this reference the piston rod extends through the cylinder and the grip holder in the axial direction and is guided in a longitudinally and sealing manner. A toggle joint arrangement is coupled with a clamping arm at the free end of the piston rod. Limit switches including plugs for feeding current to the limit switches are provided. The plugs are arranged at different positions on the toggle clamping device, with (a) a prismatic connecting body, to which the plug which is an angle plug is connected, and arranged in a corner recess of the cylinder and/or of the bottom cover;

(b) the prismatic connecting body has a threaded bore with which the angle plug is coupled;

(c) the prismatic connecting body has an interior space to which the threaded bore is connected, the electric leads leading into the interior space;

(d) the prismatic connecting body being arranged in several—preferably in three—mounting positions deviating from each other by 90° and is detachably locked in the corner recess.

There is disclosed in DE 91 05 755.8 U1 a clamping device consisting of a headpiece with a mechanical adjusting device for the clamping lever and an actuating cylinder for the mechanical adjusting device attached to the headpiece by means of armature bars. An adjustable final position interrogator elements being arranged in the actuating cylinder which has allocated to it a final position transmitter which is in work connection with the piston rod and whose cables are carried to the cylinder end. The final position interrogator elements, such as micro-switches, are arranged on stirrup-type supports which are adjustably and are fixed to two adjoining armature bars.

The UK Patent No. 1,413,751 relates to a pressure medium actuated toggle clamping device for body parts, consisting of a housing with a cylinder chamber for the piston, at the free piston rod end. Guide means for the piston rod and a piston rod pin are connected through a strap with the toggle joint of a work clamping end angle lever. The cylinder return stroke chamber and the cylinder clamping stroke chamber can alternately be connected to either the pressure-means source or vented via one each connection duct. The piston subdivides the cylinder into a cylinder return stroke chamber and into a cylinder clamping stroke chamber. The cylinder return stroke chamber and the cylinder clamping stroke chamber can alternately be connected to either the pressure-means source or vented via one each connection duct. Furthermore, the cylinder clamping stroke chamber is closed in a sealing manner by a cover on the back end side to which a damping device for braking the opening movement of the piston is allocated.

The work clamping end angle lever is swivel mounted on a journal supported in the housing. The guide means for the piston rod consist of the ends of the piston rod pin and the guide grooves arranged in the housing that extend in the axial direction of the piston rod. In addition, a stroke limiting stop or buffer is arranged at the bottom of the cylinder chamber which is infinitely axially adjustable from outside by means of an adjusting screw. Furthermore, the toggle clamping device is characterized in that the housing carries a fixing eye and is supported on a pivot pin to enable the housing to be pivoted when moving the piston and piston rod. The housing can be maintained stationary in any position. Furthermore, the arrangement makes it possible to position the housing so as to be movable about a center of rotation. The center of rotation can be on the side with the cylinder chamber so that the housing can be swiveled. This offers the advantage that the housing can be moved towards and/or away from the work during the clamping operation. Depending on the respective requirements, the axial movements of the piston and of the piston rod can also be performed simultaneous with the movement of the housing. A characteristic feature of this reference is that the working range of the angle lever is infinitely variable, at option, by the infinitely variable stroke of the piston. It is possible to move the angle lever within a working rang of up to 180°. The piston rod is always safely movable from its final position without requiring any special effort even if the angle lever has been pivoted all the way into its zero or dead position. The buffer at the bottom is a buffer consisting of for example rubber.

BRIEF SUMMARY OF THE INVENTION

The object of the invention is to design a toggle clamping device for use in car bodywork construction in the motor vehicle industry, in such a manner that its setup and adjustment are specially facilitated, on the one hand, and that its exterior is largely free of objectionable device and or components.

The toggle clamping device, in accordance with the present invention, enables the cylinder final position, the opening angle of a clamping arm, the final position interrogator device and, if applicable, the final position damping device to be adjusted simultaneously and jointly through an adjusting element. If, for instance, working conditions should change, only an adjustment of the adjusting element has to be made without any need for dismantling the toggle clamping device and its cylinder. This permits joint and simultaneous adjustment and, if applicable, locking in the desired position of the matching parameters, i.e., cylinder final position, opening angle of the clamping arm, final position interrogator device and, if necessary, also the final position damping device. If necessary, this can also be done during operation which is an advantage if it should become evident, for instance, that tolerances cannot be accurately kept or if the contours of the parts to be clamped should change. In this case, it is possible to actuate the adjusting element from outside of the toggle clamping device in order to perform the desired adjustments in one process. This is an advantage which should not be underestimated since in that case there will be no downtime of the motor vehicle assembly lines. Stopping a motor vehicle assembly line is very expensive. In addition, the adjusting element permits the respectively desired sensitive adjustment under operating conditions. Since the adjusting element can be arranged at a non-impeding position, for instance at the cylinder bottom, the outer contour of the toggle clamping device is not prejudicially affected so that its all-round possibility of attachment from four sides remains intact. Also, it is not necessary to provide openings in the cylinder or grip holder for the arrangement, for instance, of sensors. On the contrary, with this configuration it is possible to move all electric leads, sensors and damping elements into the toggle clamping device, e.g., into the cylinder and/or the grip holder.

As can be seen, sensors and contacts, as well as electric leads, are arranged in a protected manner in all embodiments. A special advantage lies in the fact, however, that the cylinder final interrogator device, the opening angle, the final position interrogator device and, if necessary, the final position damping device can be changed sensitively and locked simultaneously and in the same direction, i.e., very quickly and with toggle clamping device installed, by means of a simple tool.

In accordance with the present invention, the adjusting device is designed as an adjusting screw which is lockable by means of a lock nut. However, it should be understood that, this invention contemplates that the adjusting device could be in the form of a linear motor, an air motor, a hydraulic motor or as a piston cylinder unit to be acted upon alternately on both sides by pressure from a pressure medium.

Within the scope of the inventive conception there are, also solutions according to the invention in which the brake piston is adjustable in intermittent-steps in the axial direction. This intermittent-step adjustment simultaneously adjusts the cylinder final position, the opening angle, the final position damping device and the final position interrogator device.

In accordance with the present invention, the brake piston is supported and locked by several interchangeable spacers arranged in tandem in longitudinal axis direction of the cylinder. The spacers support themselves against each other so that, by interchanging and/or by increasing or reducing the number of these spacers, the axial position of the brake piston and, thus, the opening angle, the final position interrogator device and, if necessary, the final position damping device can be predetermined and adjustable in the cylinder.

Advantageously, the spacers in accordance with the present invention, are designed as rings, and as such are symmetrical parts which are easy to manufacture. Furthermore, these rings may be manufactured from a suitable plastic which contributes towards weight minimization. A reliable, accurate arresting device has been provided by the adjusting screw that extends through the spacers and is screwed into threads formed in the brake piston. Also contributing to this invention is the mechanism for axially clamping the brake piston against the spacers and against the cylinder bottom.

The screw, with a hexagonal recessed hole, can be locked by a lock nut having a larger hexagonal recessed hole. Both the head of the adjusting screw and the head of the lock nut are arranged in an enlarged recess of the bore in the cylinder bottom. The adjusting operation is started by loosening the lock nut with the larger hexagonal recessed hole by half a revolution, whereupon the adjusting screw can be turned with an Allen-type wrench through the larger internal opening of the nut with hexagonal recessed hole in order to make the new adjustment. Then the adjusting screw is locked again by means of the lock nut.

The adjusting screw is sealed pressure medium tight at its non-threaded longitudinal portion by a sealing element located in the cylinder bottom. According to the present invention, the brake piston is provided with a one-piece bearing extension in which is formed the thread for the adjusting screw.

In accordance with this invention, an embodiment is described in which the piston and the brake piston jointly form the damping device for braking the opening movement of the piston. Since the brake piston is arranged in a coaxial relationship to the piston in a common cylinder, it is possible to axially adjust the brake piston by means of the adjusting element in order to thereby adjust and lock the cylinder final position, the opening angle of the clamping arm and, if necessary, the final position interrogator device and the final position damping device simultaneously and jointly. Also, in accordance with is invention, the adjusting element can be mechanically, hydraulically or electro-hydraulically adjustable.

In a particularly advantageous embodiment of the invention, the brake piston is provided with a brake chamber arranged in, preferably a central relation to the adjusting the screw into which the piston engages, in a sealing manner with a one-piece extension formed as a damping piston.

In accordance with the present invention, the throttle device has a duct with a throttle bore and/or a throttle valve arranged in the brake piston. The throttle device connecting the cylinder clamping stroke chamber with an expansion chamber is arranged at the rear of the brake piston which is connected to the relief duct. This arrangement provides a compact construction where all rotating parts can be designed to present rotation symmetry.

A further advantageous embodiment of this invention is that the adjusting screws reach through the spacers and are screwed into threads formed in the brake piston so that the brake piston is axially clamped against the spacers and against the cylinder bottom, resulting in a reliable, accurate arrest mechanism.

An embodiment of the present invention, that is of particular advantage, comprises the final position interrogator devices, such as sensors micro-switches, inductive proximity switches or the like, being integrally arranged in the piston and/or in the cylinder and/or in the piston, i.e., in the toggle clamping device, thereby being supported in a protected manner in the device itself. This arrangement provides the additional advantage that there are no outwardly projecting parts and that tampering with the sensors by unauthorized persons is prevented.

Another embodiment of this invention that is of particular advantage is that the toggle clamping device can be attached to work components from all four sides. In certain cases, this is an extremely important advantage.

A further inventive and particularly advantageous embodiment is the arrangement in which the sensor is arranged in the brake piston whereas all other electric leads or the like are integrated into the toggle clamping device itself.

A still further advantage of this embodiment is that the sensors and the like are also integrated into the toggle clamping device in a protected manner.

The configuration in accordance with the present embodiment results in a compact, easily maintained construction.

A further embodiment includes pneumatic lines as well as a pneumatic directional valve that are integrated in the adapter plate.

A further embodiment, in accordance with the present invention, is that the critical positions can be accurately determined by a displacement gauge and then transferred, for instance, to a micro-processor or an SPS thereby making it possible to trigger a sequence control, e.g., automatically and/or manually. This also applies to the means of solution as, for instance, described in connection with the non-contact sensors. This also applies to the embodiments including an adapter plate and the displacement gauges and/or position transmitters. For instance, these solutions can also be generally applied to sequence controls for piston cylinder units to be acted upon with pressure medium pressure in the industrial sector.

All embodiments of this invention are characterized in that both the lock nut and the adjusting element can be actuated with just one simple tool, e.g., a hexagon socket wrench, in order to accomplish the necessary adjustment of the brake piston and, thus, the angle of swing or the like. This makes it possible to adjust the parameters requiring adjustment very sensitively, if necessary infinitely, and also to lock them in the respectively desired position. With toggle clamping devices already installed, this is also done without any need for loosening any structural parts since the adjusting element designed as an adjusting screw is accessible from the cylinder bottom.

BRIEF DESCRIPTION OF THE DRAWINGS

The drawings illustrate the invention—in partly diagrammatic representation—by way of several embodiments of the invention.

DETAILED DESCRIPTION OF THE INVENTION

Figure 1:
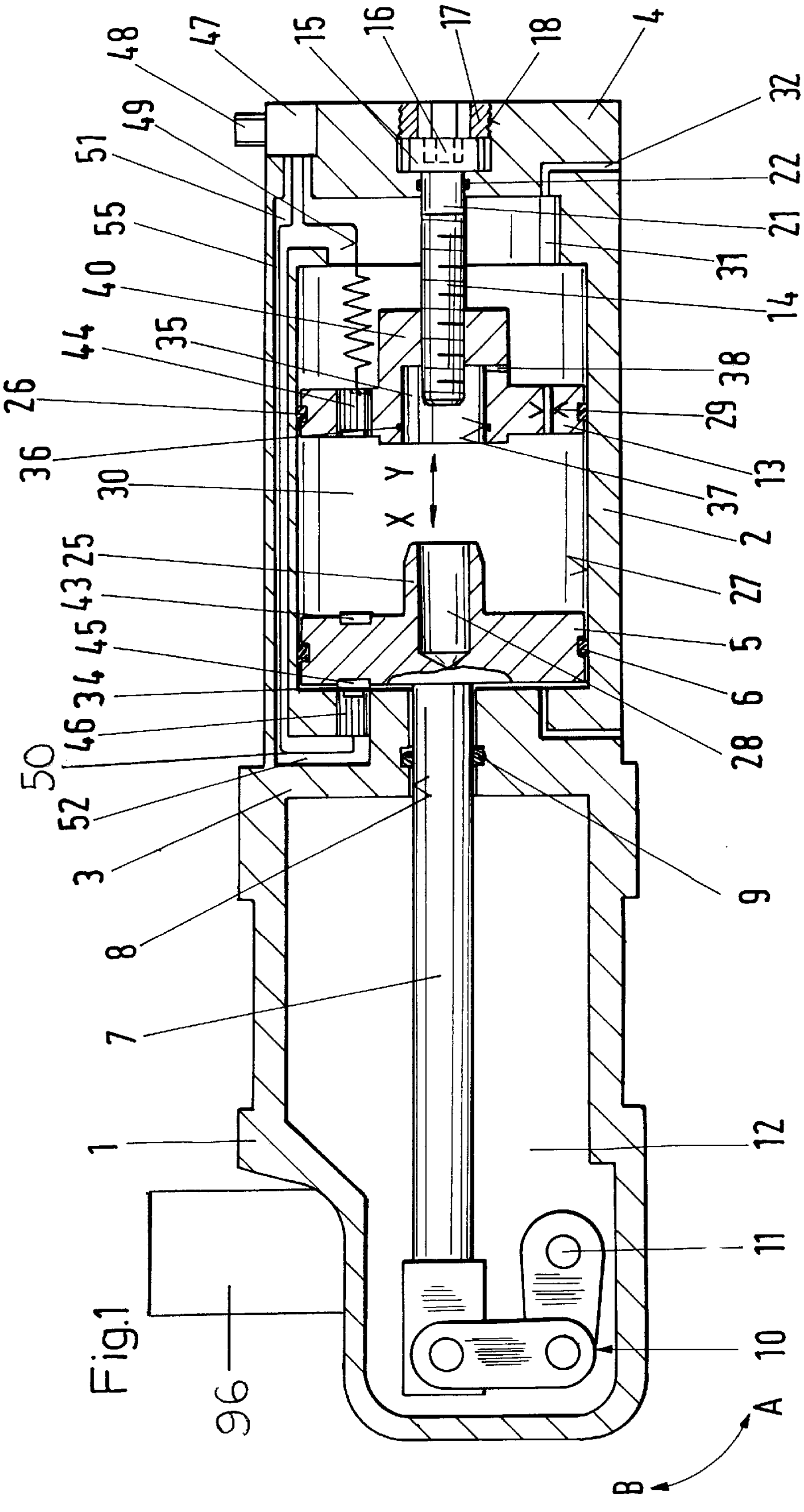
FIG. 1 is a longitudinal sectional view of a first embodiment of the invention.

Referring to the embodiments shown in the drawing, the numeral 1 designates a grip holder to which a cylinder 2 is attached in axial extension. The cylinder 2 is sealed in a pressure-medium tight manner at the end facing the grip holder 1 by a wall or a cover 3, and at the opposite end by a cylinder bottom 4 configured, for instance, as a cover.

In the cylinder 2 there is arranged a piston 5 in a longitudinally displaceable and sealing manner which is sealed by a seal 6. The piston 5 is connected to a piston rod 7. The piston rod 7 extends through a bore 8 formed in the cover 3 and is sealed in a pressure medium tight manner by a seal 9. The cylinder is designed in cross section as a cylinder deviating from circularly, e.g., flat oval. The piston 5 is adapted to this cross sectional shape so that it will be guided in a torsion-proof manner in the cylinder 2. "Flat oval" is to be understood as a cross sectional shape which consists of longer sides extending in parallel with each other in a cross section guided orthogonally in relation to the longitudinal axis of the cylinder 2 and which are connected with each other at the circular arcs or curves existing at their narrow sides turned away from each other. Oval shapes, for instance, are also taken into consideration.

The piston rod 7 extends axially through the grip holder 1 and is connected at its end with a toggle joint arrangement 10 to which a clamping arm 96 is allocated. The clamping arm 96, as is well known in the art, is arranged for pivotal movement in the grip holder 1 in direction A and/or B by a certain angle of swing about an axle 11 fixed to the housing. The angle of swing can be an obtuse angle.

The grip holder 1 is provided with a housing which, in the illustration given of the embodiment, consists of two dish-shaped housing sections which are lying on top of each other sandwich-like and apertureless, thereby encasing the piston rod 7, the toggle joint arrangement 10 and all other objects located between the housing sections in a dirt and dust proof manner. The housing sections are separated from each other by walls and are detachably connected with each other by screws (not drawn). If required, the walls may have sealing elements associated to them. The housing sections are closed all-round and merely have one each approximately semicircular recess on their one side (not illustrated) which, thereby, complement each other into the bore 8 through which the piston rod 7 extends into the space 12 limited by the housing sections. The toggle joint arrangement 10 is also arranged in this space 12. The end of the piston rod 7 lying within the space 12 and the toggle joint arrangement 10 are, thus, encased towards the outside in a dirt, dust and splash proof manner.

The two dish-shaped housing sections have one each bore extending orthogonally through them (not illustrated) through which the axle 11 extends. Instead, the axle 11 may, however, also be supported in forms of the respective housing sections which are not penetrating towards the outside. Furthermore, the two dish-shaped housing sections are provided with guide grooves (not illustrated). The guide grooves can be of identical configuration and correspond with each other in the assembled state of the housing sections, such that the toggle joint arrangement 10 with associated components is guided, for instance, by rollers at low friction in longitudinal axis direction. Furthermore, the housing sections have bores for screws (not illustrated) by means of which the housing sections are screwed together joint-tight. For instance, the bores of one housing section can be designed as through-holes, in which case the associated bores of the other housing section arranged in coaxial relation thereto would then be tapped blind holes. By screwing in screw bolts (not illustrated), this would make it possible to connect the housing sections detachably, but tight with each other. The housing sections can consists of steel or aluminum or of another suitable material, e.g., an injection molding compound. The walls adjoining each other in the junction can be of high quality design, e.g., ground or cast with a corresponding surface so that they lie on top of each other snug and joint tight.

The toggle joint arrangement 10 can have fork arms (not illustrated) allocated to it which are arranged with their ends on end sections of axle 11 of square and polygonal cross-section. With this there may be provided a holding strap which engages against the forked end of the associated fork arm and embraces the end sections of the swivel bolt with recesses of adapted shape and which is connected with the corresponding fork arm by means of screws (also not illustrated).

In addition, the fork arm can have a screw on part associated to it which is arranged centrically or eccentrically in relation to the fork arm.

The housing of the grip holder 1 is designed rectangularly in a cross-section guided orthogonally in relation to the longitudinal axis of the piston rod 7 (not illustrated). This enables the housing to be attached, e.g., screwed on, on basically four sides, viz. On the respectively opposite rectangular sides and, optionally, on device components, e.g., in car bodywork construction in the motorcar industry.

Opposite the piston 5 there is arranged a coaxially opposite brake piston 13 which is adjustable and lockable in its longitudinal axis direction, in all embodiments, by means of an adjusting element 14. In the embodiments illustrated, this adjusting element 14 is designed as a threaded screw bolt which is provided with a head 15 with a multi-cornered recess, e.g., a hexagonal recess, at its end section facing the cylinder bottom 4. The head 15 of the adjusting element 14 is to be locked by a lock nut 17 which, in the embodiments illustrated, is also provided with a multi-cornered recess, preferably also a hexagonal recess.

Figure 3:
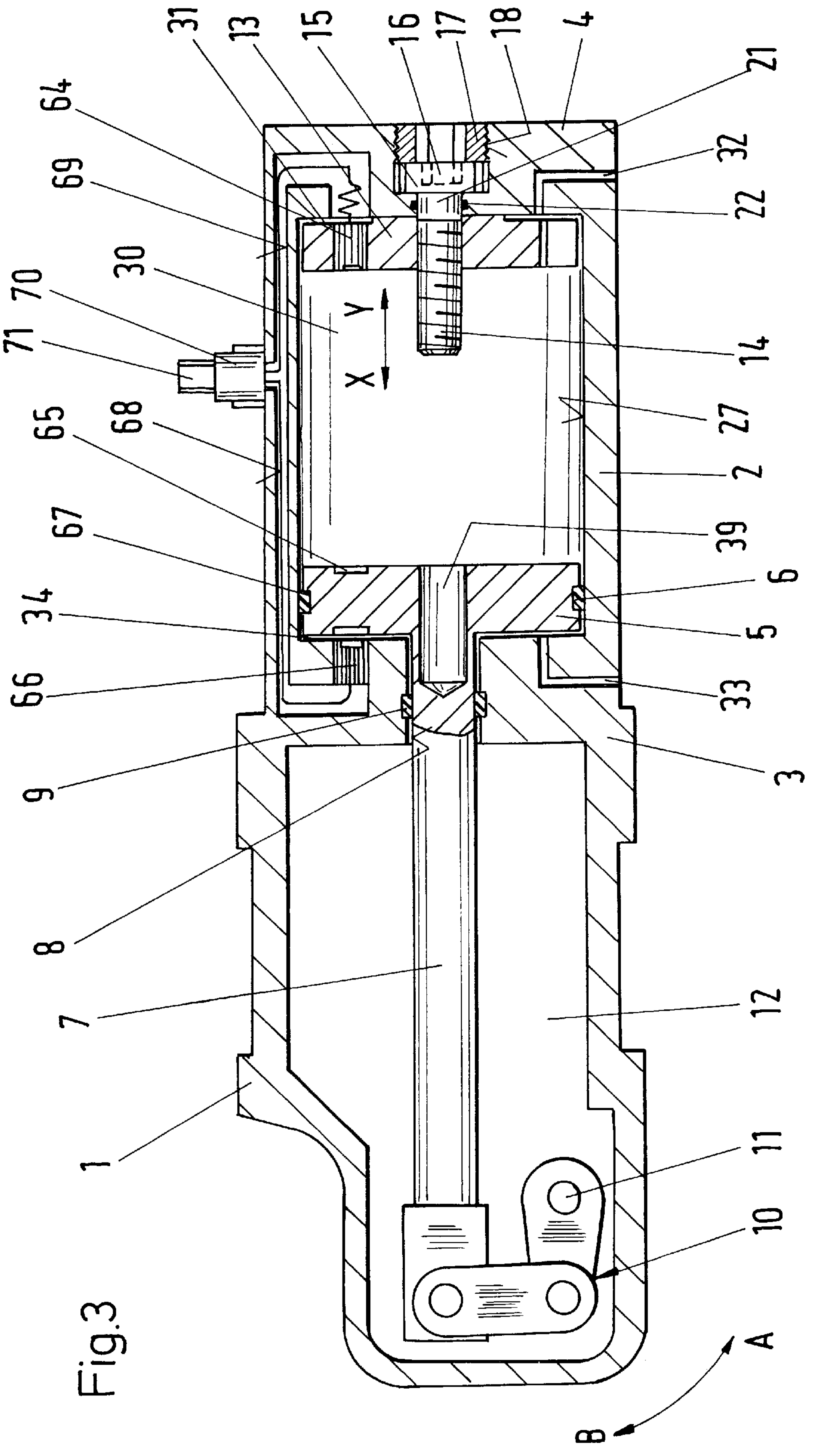
FIG. 3 is a longitudinal sectional view of a third embodiment of the invention.

In the embodiments according to FIGS. 1 and 3, the multi-cornered recess of the lock nut 17 is designed as a through hole so that it is possible also to reach into the multi-cornered recess 16 of the head 15 of the adjusting element 14 centrically through the lock nut by means of a suitable tool in order to turn the adjusting element 14 into the one or the other direction after having loosened the lock nut 17, and thereby to adjust the brake piston 13 in axial direction, i.e., in direction X and/or Y. The adjusting operating is started by inserting a suitable tool into the multi-cornered recess of the nut 17 and loosening it by half a thread, whereupon a suitable socket wrench can reach through the internal opening of the lock nut 17 into the multi-cornered recess of the adjusting element 14 in order to turn it into the one or the other direction. As a rule, relatively small adjusting paths of the brake piston 13 following a certain presetting will be sufficient for performing the necessary adjusting and setting work. Thereupon, the lock nut is again clamped against the head 15 of the adjusting element 14 in order to block it axially. As can be seen, this can be done from the outside with the toggle clamping device installed.

The head 15 of the adjusting element 14 and the lock nut 17 are arranged in a corresponding recess 18 formed in the cylinder bottom 4 which, in turn, is arranged in coaxial relation to the adjusting element 14 and, thus, also the brake piston 13 and, again, in coaxial relation to the piston 5 and the piston rod 7.

Figure 2:
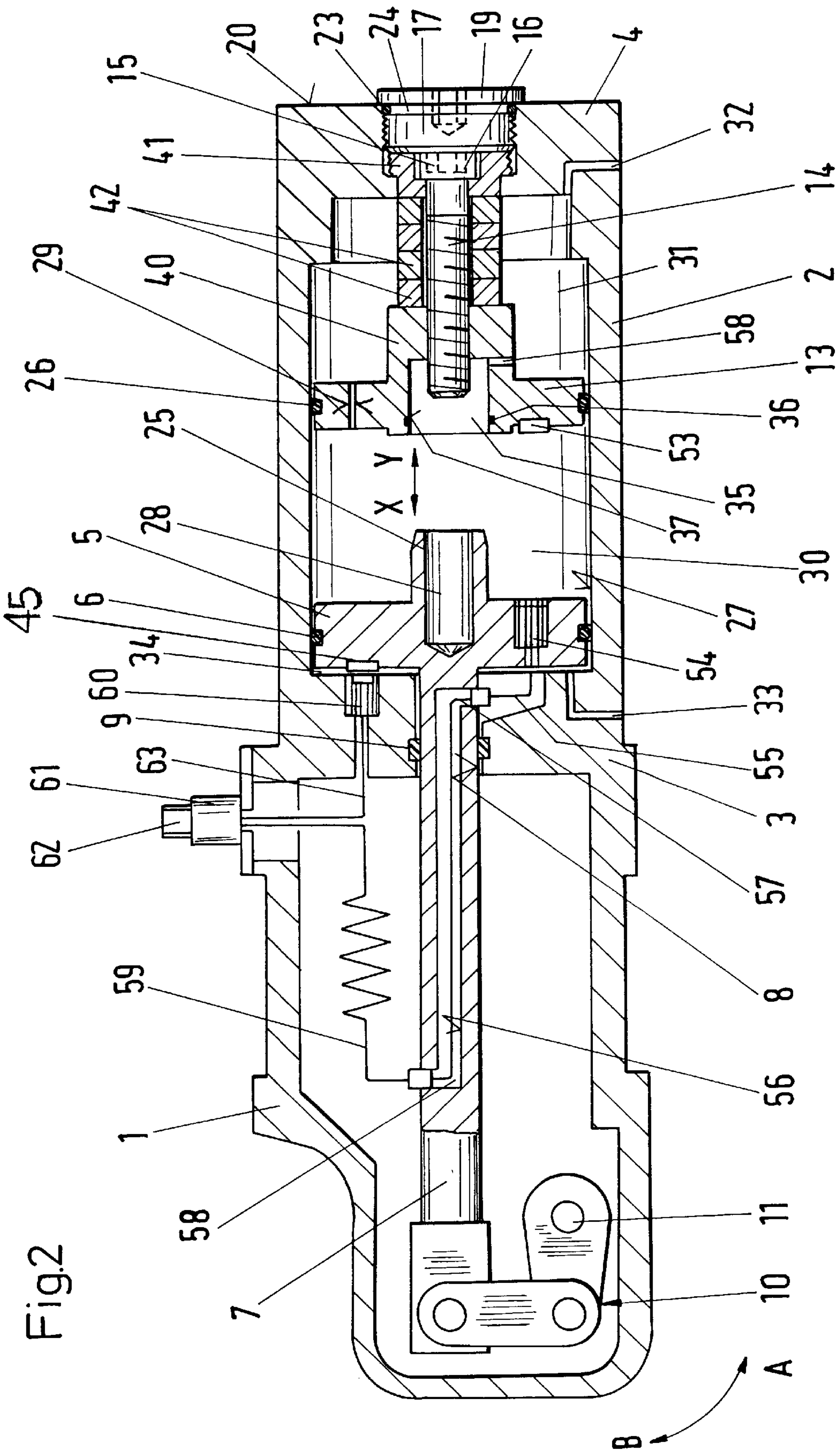
FIG. 2 is a longitudinal sectional view of a second embodiment of the invention.

In the embodiments, according to FIGS. 1 and 3, for instance, the lock nuts 17 are completely within the recess 18 which is provided with a thread, whereas in the embodiment, according to FIG. 2, the lock nut 17 supports itself with an annular collar 19 against the outside 20 of the cylinder bottom 4.

Furthermore, the non-threaded bolt portion 21 of the adjusting element 14 is sealed pressure-medium tight by a seal 22. The seal 22 is arranged in a circular groove of the cylinder bottom 4.

In the embodiment, according to FIG. 2, the pressure-medium tight sealing is effected by means of a seal 23 arranged in a circular groove 24 behind the circular collar 19.

At least in the embodiments according to FIGS. 1 and 2, the brake piston 13 is sealed pressure-medium tight opposite the inner cylinder wall 27 by means of a seal 26 arranged in a groove.

In the embodiments, according to FIGS. 1 and 2, a damping piston 25, which is integral with piston 5, projects towards the brake piston 13. The interior of said damping piston 25 is provided with a chamber formed by a blind-end bore into which the adjusting element 14 can plunge with a certain longitudinal portion upon the axial stroke of the piston 5.

In all embodiments, the brake piston 13 has a duct provided with a throttle device 29, said duct connects the cylinder clamping stroke chamber 30 in a pressure-medium conducting manner with an expansion chamber 31 that is arranged at the back of the brake piston 13. This expansion chamber 31 is connected via a duct 32 to the outside or to another expansion chamber into which the pressure-medium, preferably compressed air, can escape.

On the side of the piston 5 opposite the cylinder clamping stroke chamber 30, there is a cylinder return stroke chamber 34 which receives the pressure-medium via a duct 33.

In the embodiments, according to FIG. 1, the numeral 35 designates a brake chamber into which the damping piston 25 enters in an increasingly sealing manner starting from a certain stroke. For this purpose, the brake chamber 25 is provided with circular groove 37 with a seal 36 which rests against the wall of the damping piston 25 in a sealing manner upon the movement of the damping piston 25, thereby shutting off the brake and a duct 38 connected thereto which connects the brake chamber 35 and the expansion chamber 31. After duct 38 has been closed, the pressure medium can only be displaced into the expansion chamber 31 via the throttle device 29 by the piston 5, resulting in a certain delay and braking of the movement of the stroke of the piston 5.

In the embodiment, according to FIG. 3, the brake chamber 35 is missing. Also, there is no damping piston 25. Rather, the piston rod 7 is provided with a central bore 39 into which the adjusting element 14 can enter coaxially.

In contrast to the possibility of infinitely variable adjustment of the brake piston 13 in the embodiment according to FIG. 2 adjustment is effected intermittently. For this purpose, circular spacers 42 are arranged between a lug 40 of the brake piston 13 and a threaded bush 41 which is screwed into a recess of the cylinder bottom 4. In the embodiment, according to FIG. 2, a total of four such spacers 42 are provided. Replacing or increasing or reducing the number of the spacers 42 makes it possible to adjust and arrest the brake piston 13 in steps in the direction from X and/or Y. This does not require all spacers 42 to be of equal thickness, but they can rather have different axial dimensions so that corresponding adjustment and arrest is possible, depending on operating conditions.

In this case, too, the adjusting element 14 is unscrewed after having loosened the lock nut 17 by inserting a wrench into the multi-cornered recess of the head 15, the number of the spacer elements an/or their shape is changed, and the adjusting element 14 is then screwed back into the threaded lug 40 of the brake piston 13, axially clamping the spacers 42 between the lug 40 of the brake piston 13 and the cylinder bottom 4 and/or the threaded bush 41, thus arresting also the brake piston 13 correspondingly.

In the embodiment according to FIG. 1, a contact 43, for instance of steel or the like, is provided in the piston 5 which interacts with at least one sensor 44 which is arranged on the opposite side in the brake piston 13. On the opposite side of piston 5, aligned with contact 43, there is provided a further contact 45 in the form of a steel body or the like which interacts with a sensor 46. The sensor 46 is arranged in a bore formed in the cover or the wall 3.

As can be seen from FIG. 1, a distribution block 47 is arranged in the cylinder bottom 4 and contains the electric and/or electronic contacts, modular units and the like. This distribution block 47 has a plug 48 allocated to it which can be connected with the corresponding electric leads for remote interrogation of the piston 5 and, thus, also of the position of the clamping arm 96 and the like.

Also, the distribution block 47 is connected via electric leads 49 and/or 50 with the sensor 44, on the one hand, and with the sensor 46, on the other. The lead 50 runs in a recess 51 of the cylinder wall and in a corresponding ducts 52 of the wall and/or the cover 3. This makes it possible to interrogate the positions of the piston 5 and also the position of the clamping arm 96. Axial adjustment of the adjusting element 14 and, thus, of the brake piston 13 makes it possible to effect an infinitely variable adjustment of the final cylinder interrogation, of the opening angle, the final-position damping and the final-position interrogation simultaneously in one movement. This can be accomplished with extreme sensitivity and can be influenced by the selection of the thread of the adjusting element 14.

Instead of using a spindle, it is also possible to use another suitable adjusting element 14, for instance a linear motor which can be remote-controlled, a hydraulic controlling element or the like.

In the embodiment, according to FIG. 2, a similar arrangement has been provided. The brake piston 13 is, again, provided with a suitable contact 53 which interacts with a sensor 54 connected with an electric lead 55 running through an axial bore 56 formed in the piston rod 7. Said bore 56 being respectively connected towards the outside via radial ducts 57 and 58. An electric lead 59 is connected to the radial duct 58, said lead being connected to a distribution block 61 having a plug 62 allocated to it which is arranged in a recess formed in the grip holder 1. Neither the distribution block 61 nor the plug 62 will affect the possibility of attachment of this toggle clamping device at the back. There are sufficiently large screw-on surfaces to enable fastening of this toggle clamping device also at the back.

The numeral 60, FIG. 2, designates another sensor which his connected with the distribution block 61via an electric lead 63.

In this embodiment, as illustrated and described, the brake piston 13 can be adjusted intermittently in contrast to the embodiment, according to FIG. 1. This adjustment by means of the circular spacers, however, also permits simultaneous and direct changing and fixing of the final cylinder interrogation, of the opening angles of the clamping arm 96, the final position damping and the final position interrogation.

In the embodiment shown in FIG. 3, opposite the contact 65, a further sensor 66 is arranged in a recess of the the cover 3. The cylinder 2, again, has a recess in the form of a duct 67 in which electric leads 68 and 69 are arranged which lead to a distribution block 70 with plug 71. The lead 68 is connected to a sensor 66, while the lead 69 is connected in an electrically conducting manner with the sensor 64.

In this embodiment, too, the final cylinder interrogation, the opening angle and the final position interrogation can be changed simultaneously and directly, and arrested simultaneously in an infinitely variable manner. In this embodiment, too, just as with all other embodiments, the distribution block 70 is provided with the corresponding electronic and/or electric elements. The distribution block 70 with plug 72 does not interfere with attachment of the toggle clamping device to device components at the back since sufficiently large surfaces for arrangement of screw holes or the like are available here.

Figure 4:
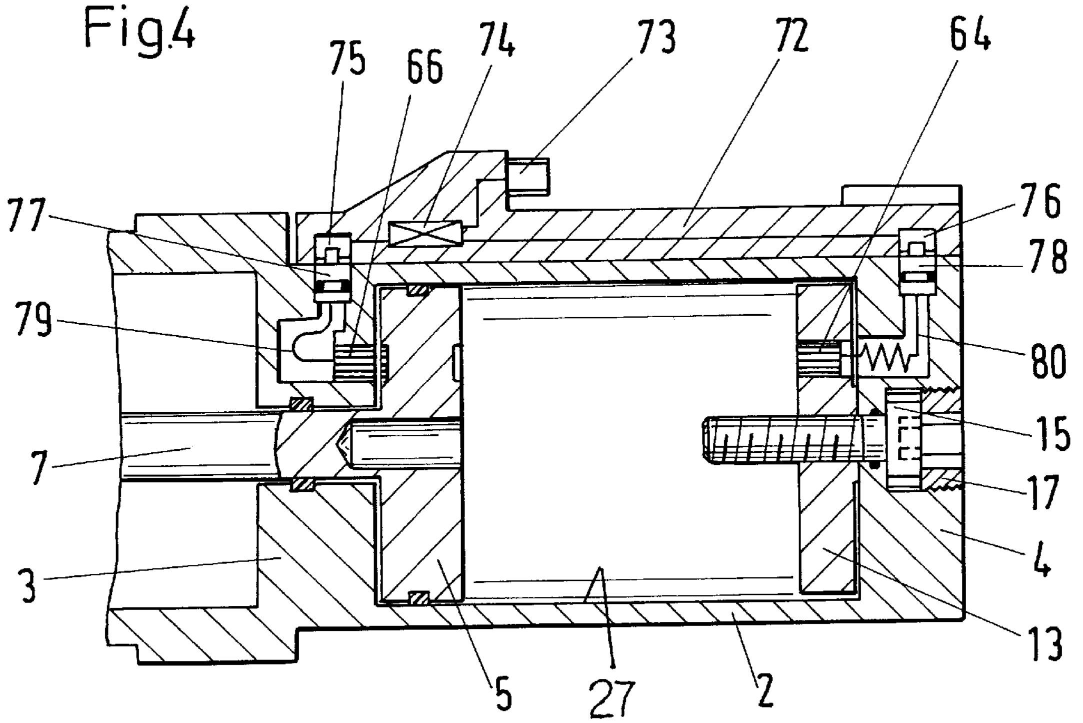
FIG. 4 shows a further embodiment, partly in longitudinal sectional view, partly in fragmentary view.

In the embodiment, according to FIG. 4, the same numerals as those used for the above-described embodiments have again been used for parts of identical function. The numeral 72 designates an adapter plate provided with a plug 73 for electrical connection, e.g., to an indicating instrument, a microprocessor or the like (not illustrated). The adapter plate 72 is, likewise, provided with an electronics module 74. Finally, plug-in parts 75 and/or 76 are provided in both end faces of the adapter plate 72 that interact with the connector plugs 77 and/or 78 in the wall 3 and/or in the cylinder bottom 4. Plug-in parts 75 and 76 and connector plugs 77 and 78 permit connection of these parts which is sealed to the extend required.

As can be seen, the adapter plate 72, moreover, extends in longitudinal axis direction of the cylinder 2 and can have its contour adapted to the outside appearance of the cylinder so that there are not projecting parts. The adapter plate is interchangeable so that, in case of trouble or changing operating conditions, an adapter plates 72 with a corresponding configuration can be replaced quickly and easily.

Electric leads 79 and/or 80 run from the connector plugs 77 and 78 to the sensor 66 in the wall 3 and/or 64 in the stop position 13.

Furthermore, it can be seen from FIG. 4 that in this embodiment, just as in the embodiment according to FIG. 3, the stop piston 13 is not sealed pressure medium tight at its circumference opposite the inner cylinder wall 27.

Figure 5:
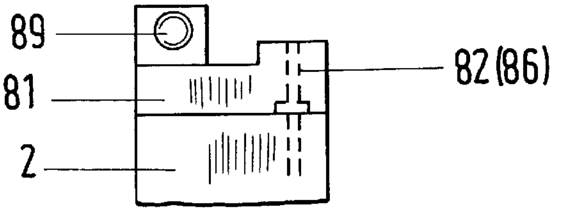
FIG. 5 is a partial view taken along the arrow "A" of FIG. 6.
Figure 6:
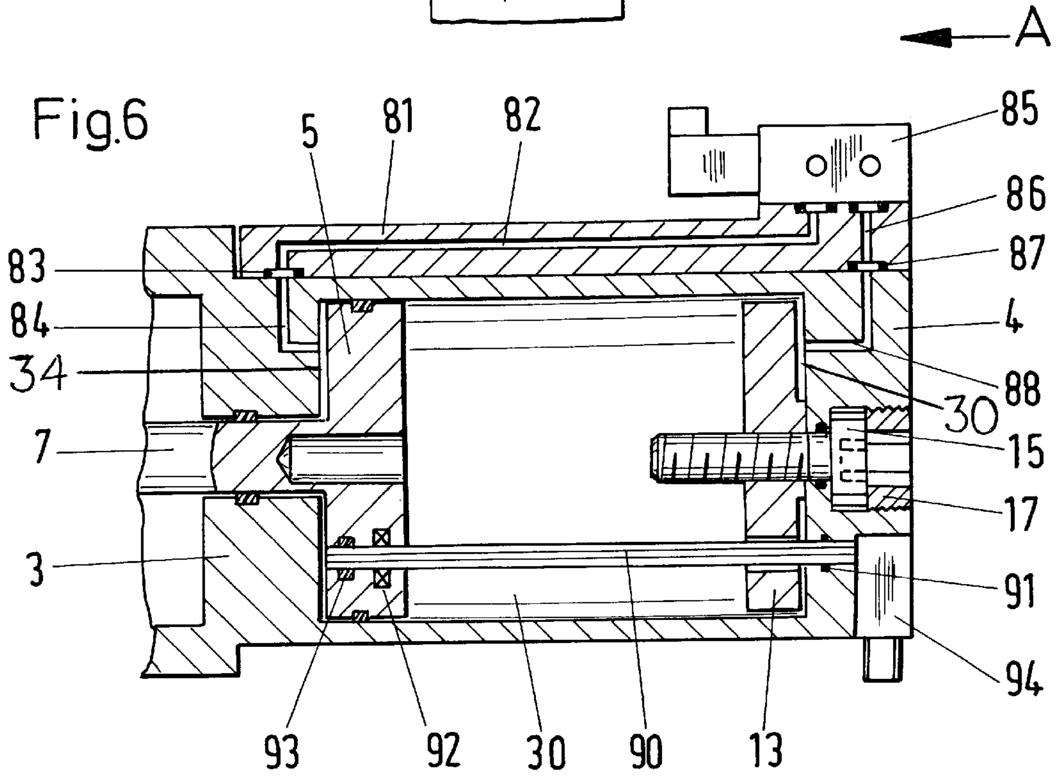
FIG. 6 shows a further embodiment of the invention, also partly in axial longitudinal sectional view.

In the embodiment according to FIGS. 5 and 6, the same numerals have again been used for parts of identical function.

As illustrated in FIG. 5, the pneumatic system of FIG. 6, is replaced by an electric system. In FIG. 5 the adapter plate 81 has been provided with an electrical connection 89.

This embodiment differs from the embodiment according to FIG. 4 in that the adapter plate 81 is provided with a pneumatic line 82 extending in its longitudinal axis direction, said pneumatic line being sealed via a seal 83 and interacts with a duct 84 in the wall 3 which opens into the cylinder return stroke chamber 34 downstream of the piston 5.

At its other end, the pneumatic line 82 opens out, in a sealed manner, into a pneumatic directional valve 85 which is connected with the adapter plate 81 in one piece, but interchangeably. The directional valve 85 is provided with a further pneumatic line 86 which interacts with the directional valve 85 in a sealed manner, on the one hand, and via a plug-in part 87 with a duct 88 in a sealed manner, on the other. Duct 88 opens into the cylinder clamping stroke chamber 30 downstream of the stop piston 13.

On the side opposite the adapter plate 81, the cylinder 2 has allocated to it a displacement gauge 90 generally consisting of a bar-shaped element which is arranged in the cylinder bottom 4 sealed by a seal 91 and extends through the stop piston 13, on the one end, and through the piston 5, on the other end. The numeral 92 designates a position transmitter, whereas numeral 93 designates a seal sealing the displacement gauge 90 relative to the piston 5. The piston 5 slides along the displacement gauge 90 upon its movement in the axial direction.

At 94, there is arranged a receiver in the cylinder bottom 4 which is connected to a SPS, a microprocessor, a signal converter or an evaluating instrument via an electric lead (not illustrated).

Depending on the position of the position transmitter 92, corresponding measured values are transmitted via the receiver 94 to the connected microprocessor or the like so that the individual positions of the toggle clamping device can also be remotely interrogated at high reliability and without contact. In a design in which a damping piston is provided, rather than a stop piston, a displacement gauge can be utilized. In this case, however, the displacement gauge 90 in piston 13 will then be arranged in a sealed manner. The angles of swing of such toggle clamping devices, if necessary a large number thereof, can then be readjusted and/or changed in a central control station.

It is also conceivable to include the displacement gauge 90 in a sequence control running automatically so that, upon reaching a certain position of piston 5, corresponding control operations are triggered automatically or manually.

What is claimed is:

1. A toggle clamping device for automobile body fabrication comprising:

a grip holder (1) and a cylinder (2) having a front end (3) and a bottom (4), said cylinder being attached at its front end to said grip holder in axial extension;

a piston (5) guided in a longitudinally displaceable, torsion-proof and sealing manner in said cylinder, said piston to be acted upon alternately on both sides by a pressure-medium;

said piston (5) includes a piston rod (7) having a free end, said piston and piston rod extends through said cylinder (2) and said piston rod further extends through said grip holder (1);

said grip holder (1) includes a housing in which a toggle joint arrangement (10) is located;

a clamping arm (96) operatively connected to said toggle joint arrangement;

said piston (5) subdividing said cylinder (2) into a cylinder return stroke chamber (34) and a cylinder clamping stroke chamber (30), said cylinder return stroke chamber (34) being closed in a sealing manner at the front end of the cylinder by a cover or housing wall (3);

a brake piston (13) in said cylinder (2) that cooperates with said piston (5) and in coaxial relation thereto;

a damping device (25,35) within said cylinder (2) for braking the opening movement of said piston (5);

remote position interrogator devices within said cylinder (2), for said piston (5) and said brake piston (13), in the form of non-contact inductive sensors (43, 44, 46, 53, 54, 60, 64, 66);

an adjusting device (14) arranged in the bottom (4) of said cylinder (5) for said brake piston (13), said adjusting device (14) being infinitely axially adjustable and lockable in both directions, without dismantling said toggle joint arrangement and clamping arm (96), from the outside of said cylinder bottom (4) to simultaneously vary and adjust the opening angle of the clamping arm (96) and some of said final position interrogator devices.

2. A toggle clamping device as set forth in claim 1, characterized in that said adjusting device (14) is designed as an adjusting screw arranged in coaxial relation to said brake piston (13), said adjusting screw being arranged in the said cylinder bottom (4) and being lockable by a lock nut (17).

3. A toggle clamping device as set forth in claim 1, characterized in that said adjusting device (14) is designed as a motor unit to be acted upon alternately on both sides with pressure-medium pressure.

4. A toggle clamping device as set forth in claim 1 or 2 or 3, characterized in that the said clamping arm is at its opening angle when said piston (5) and piston rod (7) are in the fully retracted position from which said clamping arm is movable to a final clamping position as piston (5) and piston rod (7) extend and thus, the position of said piston (5), piston rod (7) and thus said opening angle, the location of said final position interrogator devices and the position of said damping devices are adjustable in steps-intermittently-in the axial direction.

5. A toggle clamping device as set forth in claim 1, characterized in that said clamping arm is at its opening angle when said piston (5) is in the fully retracted position from which it is movable to a final clamping position as piston (5) extends, and said brake piston (13) is supported and locked by several interchangeable spacers (42) arranged in tandem in longitudinal axis direction of the cylinder (2) and supporting themselves against each other and against the brake piston (13), at one end, and against the cylinder bottom, at the other end, such that said interchangeable spacers (42) permit the axial position of the brake piston (13); and thus, the opening angle, the final position of said interrogator devices as well as the final position of said damping devices to be predeterminably adjustable in the cylinder (2).

6. A toggle clamping device as set forth in claim 2, characterized in that said clamping arm is at its opening angle when said piston (5) is in the fully retracted position from which it is movable to a final clamping position as piston (5) extends, and said brake piston (13) is supported and locked by several interchangeable spacers (42) arranged in tandem in longitudinal axis direction of the cylinder (2) and supporting themselves against each other and against the brake piston (13), at one end, and against the cylinder bottom, at the other end, such that said interchangeable spacers (42) permit the axial position of the brake piston (13) and thus, the opening angle, the final position of said interrogator devices as well as the final position of said damping devices to be predeterminably adjustable in the cylinder (2).

7. A toggle clamping device as set forth in claim 5, characterized in that said interchangeable spacers (42) are designed as rings.

8. A toggle clamping device as set forth in claim 6, characterized in that said brake piston (13) has screw threads formed therein and said adjusting device (14) is an adjusting screw which is screwed into said screw thread of the brake piston (13) reaching through said spacers (42) and axially clamps the brake piston (13) against the spacers (42) and against the cylinder bottom (4).

9. A toggle clamping device as set forth in claim 2, characterized in that said adjusting screw (14) has a hexagonal recessed hole and said lock nut (17) has a hexagonal recessed hole, and the heads of both the adjusting screw and the lock nut are located in a recess (18) formed in the cylinder bottom (4).

10. A toggle clamping device as set forth in claim 2, characterized in that said adjusting device (14) is an adjusting screw, said adjusting screw including a non-threaded portion, said adjusting screw being sealed pressure-medium tight by a seal between the non-threaded portion of said adjusting screw and the cylinder bottom (4).

11. A toggle clamping device as set forth in claim 1 or 2, characterized in that said brake piston (13) is provided with a lug (40) having threads formed therein for receiving said adjusting screw (14).

12. A toggle clamping device as set forth in claim 1 or 2, characterized in that said cylinder return stroke chamber (34) has a duct (33) through which it can be connected to a pressure source or relieved of pressure and said cylinder clamping stroke chamber (30) is connected to a duct (32) through which it can be connected to a pressure source or relieved of pressure;

said brake piston (13) having a throttle device (29) formed therein;

said piston (5) and said brake piston (13) jointly forming said damping device (25, 35) for braking the opening movement of the piston (5), said cylinder return stroke chamber (34) and said cylinder clamping stroke chamber (30) being alternately connected to a pressure source or relieved of pressure through said ducts (32, 33), said duct (32) can be opened to thus relieve the cylinder clamping stroke chamber (30) or to be connected with the pressure-medium source, whereupon the cylinder clamping stroke chamber (30) is pressure compensated through said throttle device (29).

13. A toggle clamping device as set forth in claim 1 or 2, characterized in that said piston (5) includes a one-piece brake extension formed as a damping piston (25); and said brake piston (13) has a brake chamber (35) formed therein in alignment with said adjusting screw (14) into which said damping piston (25) engages in a sealing manner.

14. A toggle clamping device as set forth in claim 1 or 2, characterized in that said brake piston (13) has a throttle device (29) formed therein that is connected to a duct (32) formed in cylinder (2);

said throttle device (29) connecting the cylinder clamping stroke chamber (30) with an expansion chamber (31) formed at the rear of the brake piston (13) which is in fluid communication with said duct (32).

15. A toggle clamping device as set forth in claim 1 or 2, characterized in that said brake piston (13) is guided in a torsion-proof manner within cylinder (2) and includes a piston portion that has a groove formed in its peripheral edge that receives a seal (26), said brake piston (13) also includes a lug portion (40) in which threads are formed for accommodating the adjusting screw (14).

16. A toggle clamping device as set forth in claim 1 or 2, characterized in that said final position interrogator devices are integrally arranged in said piston (5).

17. A toggle clamping device as set forth in claim 1 or 2, characterized in that some of said final position interrogator devices are integrally arranged in said cylinder wall (3).

18. A toggle clamping device as set forth in claim 1 or 2, characterized in that a distribution block (47) including a connector plug (48) is provided on the outside of the toggle clamping device at the cylinder bottom (4) that is adapted to be connected with electric leads for remote position interrogation of the piston.

19. A toggle clamping device as set forth in claim 1 or 2, characterized in that a distribution block (70) including a connector plug (71) is provided on the outside of the toggle clamping device on the side wall of the cylinder (2) that is adapted to be connected with electric leads for remote interrogation of the piston.

20. A toggle clamping device as set forth in claim 1 or 2, characterized in that a distribution block (61) including a connector plug (62) is provided on the outside of the toggle clamping device at the side wall of said grip holder (1) that is adapted to be connected with electric leads for remote interrogation of the piston.

21. A toggle clamping device as set forth in claim 1 or 2, characterized in that a sensor (44) is arranged in said brake piston (13);

an electric distribution block (47) including a plug (48) is arranged in said bottom (4) of the cylinder (2);

an electric lead (49) connecting said sensor (44) and said electric distribution block (47);

a sensor (46) arranged in said grip holder (1);

an electric lead (50) connecting said sensor (46) and said electric distribution block (47);

contacts (43, 45) on diametrically opposite sides of piston (5) which interact with sensor (46) located in the grip holder, on the one hand, and with sensor (44) located in the brake piston (13), on the other.

22. A toggle clamping device as set forth in claim 21, characterized in that said cylinder (2) includes an expansion chamber (31) formed at the rear of the brake piston (13);

said distribution block (47) being coupled with said sensors (44, 46) through electric leads which are partly arranged in said expansion chamber (31), partly in the wall of the cylinder (2) and partly in the front end (3) of the cylinder (2).

23. A toggle clamping device as set forth in claim 1 or 2, characterized in that said piston (5) is provided with a sensor (54) on its side facing said brake piston (13);

a distribution block (61) including a plug (62) arranged in the grip holder (1);

a steel contact (53) arranged in the brake piston (13) such that it interacts with said sensor (54);

a steel contact (45) arranged in the side of piston (5) facing the grip holder (1);

a sensor (60) arranged in the front end (3) of the cylinder (2) such that it interacts with contact (45);

said sensors (54, 60) are connected via electric leads with said distribution block (61).

24. A toggle clamping device as set forth in claim 23, characterized in that said electric leads for sensor (54) arranged in piston (5) extend through a bore (56) formed in said piston rod (7).

25. A toggle clamping device as set forth in claim 23, characterized in that part of said electric leads for sensor (60) arranged in front end (3) extend through a bore (56) formed in said piston rod (7).

26. A toggle clamping device as set forth in claim 1 or 2, characterized in that said cylinder (2) has allocated to it an adapter plate (72) extending laterally in the direction of its longitudinal axis, said adapter plate (72) being interchangeably arranged at the cylinder (2) and having a connector plug (73) for the connection of electric junction lines that lead to electric sensors and components.

27. A toggle clamping device as set forth in claim 26, characterized in that said adapter plate (72) includes plug-in-parts (75, 76) that interact with plug-in-parts (77, 78) arranged in said front end (3) and said cylinder bottom (4) respectfully.

28. A toggle clamping device as set forth in claim 26, characterized in that said cylinder (2) has allocated to it an adapter plate (81) extending laterally in the direction of its longitudinal axis, said adapter plate (81) has a pneumatic directional valve (85) and pneumatic connections integrated therewith;

a pneumatic line (82) running in said adapter plate (81) and extending in the direction of the longitudinal axis of cylinder (2);

a duct (84) formed in said front end (3), that is in communication with said pneumatic line (82), and opens into said cylinder return stroke chamber (34);

a pneumatic line (86) formed in said adapter plate (81);

a plug-in-part (87) arranged in the wall of cylinder (2) to which said pneumatic line (81) is connected.

29. A toggle clamping device as set forth in claim 1 or 2, characterized in that said cylinder (2) has a displacement gauge (90) allocated to it;

a position transmitter (92) that interacts with said displacement gauge (90) to create a signal indicating the position of piston (5) within cylinder (2);

a receiver (94) arranged in said cylinder bottom (4) that is adapted to be connected to a micro processor.

30. A toggle clamping device as set forth in claim 29, characterized in that said position transmitter (92) is arranged in said piston (5), and said displacement gauge (90) extends through piston (5), cylinder clamping stroke chamber (30) and damping piston (13) and is supported in the cylinder bottom (4).

* * * * *